(12) United States Patent
Hiraki et al.

(10) Patent No.: US 6,921,028 B2
(45) Date of Patent: Jul. 26, 2005

(54) DISPERSING APPARATUS

(75) Inventors: Masahiko Hiraki, Kamakura (JP); Yushi Taguchi, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 329 days.

(21) Appl. No.: 10/381,397

(22) PCT Filed: Jun. 8, 2001

(86) PCT No.: PCT/JP01/04863
§ 371 (c)(1),
(2), (4) Date: Mar. 21, 2003

(87) PCT Pub. No.: WO02/100521
PCT Pub. Date: Dec. 19, 2002

(65) Prior Publication Data
US 2004/0094637 A1 May 20, 2004

(51) Int. Cl.$^7$ ............... B05B 9/00; F23D 11/10; F23D 11/16
(52) U.S. Cl. .......... 239/127; 239/124; 239/126; 239/418; 239/419; 239/399
(58) Field of Search ............... 239/124, 127, 239/126, 398, 418, 419, 423, 424, 349, 373

(56) References Cited

U.S. PATENT DOCUMENTS

| | | | | |
|---|---|---|---|---|
| 4,173,530 A | * | 11/1979 | Smith et al. | 209/9 |
| 5,482,402 A | * | 1/1996 | Nelson | 405/128.65 |
| 5,558,842 A | * | 9/1996 | Vassiliou et al. | 422/108 |
| 5,964,985 A | * | 10/1999 | Wootten | 201/40 |
| 6,029,915 A | | 2/2000 | Inoue | |

FOREIGN PATENT DOCUMENTS

| | | |
|---|---|---|
| DE | 41 35 648 | 5/1993 |
| DE | 195 38 476 A | 4/1997 |
| EP | 0 464 654 A2 | 1/1992 |
| EP | 0 473 942 A | 3/1992 |
| JP | 56 115623 | 9/1981 |
| JP | 05 46393 | 6/1985 |

* cited by examiner

*Primary Examiner*—Davis Hwu
(74) *Attorney, Agent, or Firm*—Knobbe Martens Olson & Bear LLP

(57) ABSTRACT

Disclosed is a dispersing apparatus comprising a container body; a sealable lid detachable from the container body; a mixing shaft supported by and extending from the lid and having a mixing member; an enclosing member supported by the lid or the mixing shaft and surrounding the mixing member; the enclosing member containing pulverizing media and permitting a pigment-vehicle fluid to pass therethrough; a vacuum pump connected to the lid through a condenser and pipes to reduce the pressure in the container body; and a recovery tank connected to the condenser to collect a liquid fraction separated from a gas fraction by the condenser; wherein the recovery tank and the condenser are connected to the lid through pipes so that the liquid fraction separated by the condenser can be returned from the recovery tank or the condenser to the container body when required, in order to control the viscosity of the pigment-vehicle fluid.

5 Claims, 1 Drawing Sheet

DISPERSING APPARATUS

RELATED APPLICATIONS

This application is the U.S. National Phase under 35 U.S.C. § 371 of International Application PCT/JP01/04863, filed Jun. 8, 2001, which was published in English on Dec. 19, 2002.

FIELD OF THE INVENTION

The present invention relates to an apparatus for dispersing pigment particles in a vehicle in the course of producing a paint as a final product, and more specifically, to an apparatus for pulverizing aggregates of a pigment into primary particles in a water-based or oil-based vehicle under reduced pressure in order to prepare a pigment-vehicle fluid comprising the primary particles of the pigment uniformly dispersed in the vehicle. The term "vehicle" is intended to mean a fluid containing all other components of a paint than pigments.

PRIOR ART

It is known to disperse pigment particles in a water-based or oil-based vehicle under reduced pressure to obtain a pigment-vehicle fluid comprising the pigment particles dispersed in the vehicle, which is useful for producing paints as final products (for example, Japanese Examined Patent Publication No. 46393/1993).

A paint is usually produced by a process comprising the premixing step of preliminarily mixing a pigment and a water-based or oil-based vehicle; the dispersion step of deflocculating aggregates of the pigment in the vehicle and dispersing the deflocculated particles in the vehicle; and an adjusting step of subjecting the pigment-vehicle fluid comprising the pigment particles dispersed in the vehicle to treatment such as toning to obtain a paint as a final product. Conventionally, the above three steps are carried out in three separate container bodies of a premixer, a dispersing device and a mixer for adjustment, respectively.

However, these devices having separate container bodies require a large installation space, since the container bodies are usually of large size.

SUMMARY OF THE INVENTION

The object of the present invention is to provide a dispersing apparatus comprising a container body which can be used in all of the premixing step, dispersion step and adjusting step.

The dispersing apparatus of the invention comprises a container body; a sealable lid detachable from the container body; a mixing shaft supported by and extending from the lid and having a mixing member; an enclosing member supported by the lid or the mixing shaft and surrounding the mixing member, the enclosing member containing pulverizing media and permitting a pigment-vehicle fluid to pass therethrough; and a vacuum pump connected to the lid through a condenser and pipes to reduce the pressure in the container body; and a recovery tank connected to the condenser to collect a liquid fraction separated from a gas fraction by the condenser; wherein the condenser and the recovery tank are connected to the lid through pipes so that the liquid fraction separated by the condenser can be returned from the recovery tank or the condenser to the container body when required. Preferably, the container body is provided with a transfer means.

DETAILED DESCRIPTION OF THE INVENTION

Figure 1:
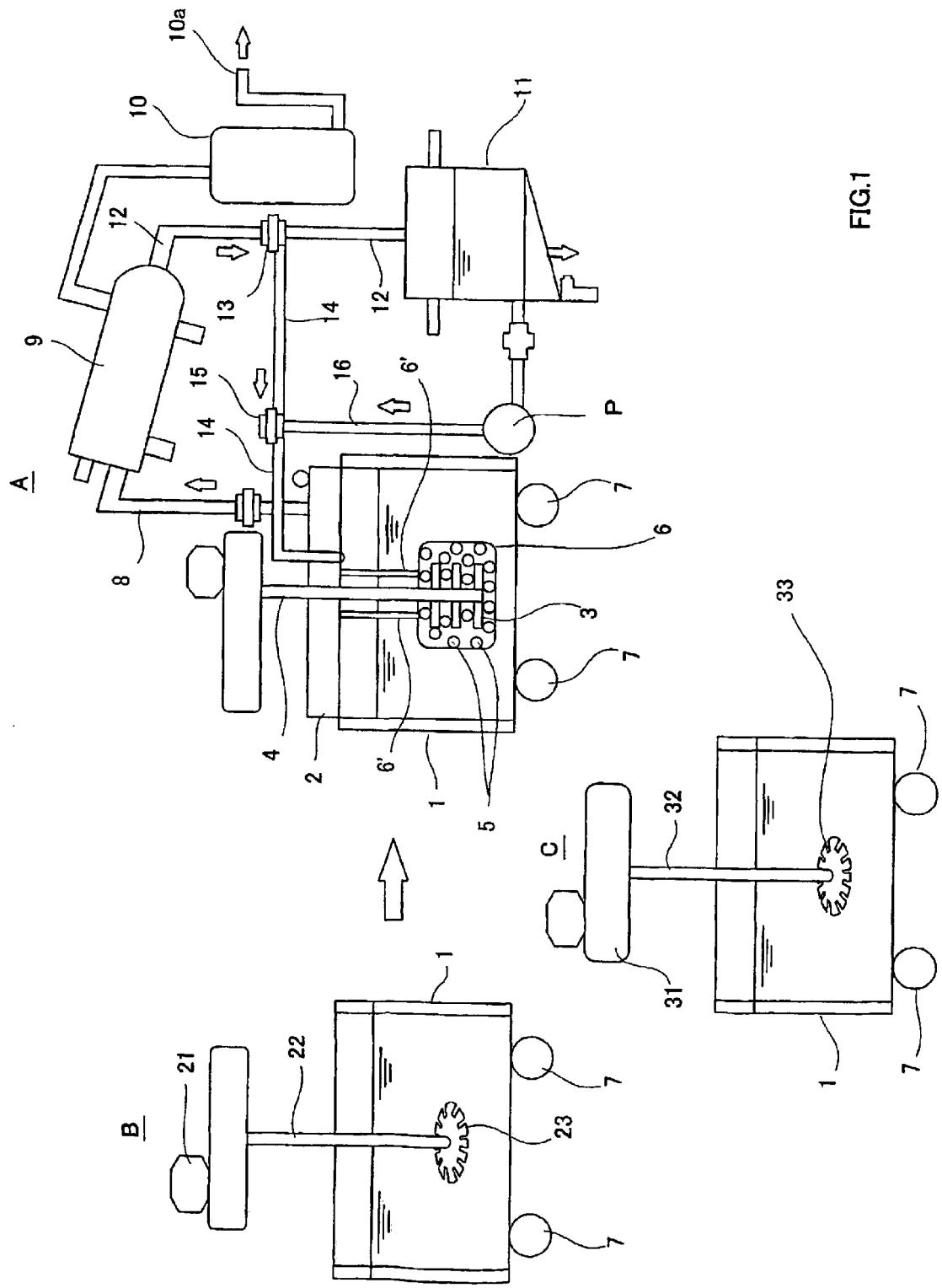
FIG. 1 is a sectional view schematically showing equipment for producing a paint comprising the dispersing apparatus of the present invention.

A preferred embodiment of the present invention will be explained below with reference to FIG. 1.

As shown in FIG. 1, the dispersing apparatus A for use in the dispersion step comprises a container body 1; a sealable lid 2 detachable from the container body 1; a mixing shaft 4 supported by and extending from the lid 2 and having a mixing member 3 at the lower end thereof; and an enclosing member 6 supported by the lid 2 via a rod 6' and surrounding the mixing member 3. The enclosing member 6 contains pulverizing media 5 and permits a pigment-vehicle fluid to pass therethrough. The container body 1 may be provided with a transfer means 7 such as wheels.

Specific examples of the enclosing member 6 are shown in Japanese Unexamined Patent Publication No. 1995-116489 by Ninomiya et al. and Japanese Unexamined Patent Publication No. 1994-86924 by Kajiura et al. As described in these publications, the enclosing member 6 can be provided with at least one inlet port (not shown) and at least one outlet port (not shown). The inlet port may be formed, for example, in the central portion of the upper surface of the enclosing member 6. The outlet port may be formed, for example, in a side surface of the enclosing member 6. The inlet port permits the pigment-vehicle fluid to pass therethrough but does not allow the pulverizing media 5 to escape from the enclosing member 6. The outlet port is preferably provided with at least one separator. The separator prevents particles larger than a predetermined size from flowing out of the enclosing member 6. The separator can be a gap separator or a separator screen. The pigment-vehicle fluid flows into the enclosing member 6 through the inlet port and flows out through the outlet port, with the rotation of the mixing member 3.

The pulverizing media 5 may be, for example, zirconia beads, hard glass beads or the like.

Further, a condenser 9 is connected to the lid 2 through a pipe 8, and a vacuum pump 10 is connected to the condenser 9 to reduce the pressure inside the container body 1. Evaporated components removed from the container body 1 by the reducing pressure therein are separated into a gas fraction and a liquid fraction in the condenser 9.

Furthermore, a recovery tank 11 is connected to the condenser 9 through a pipe 12 to collect the liquid fraction isolated from the gas fraction by the condenser 9. The pipe 12 is joined to another pipe 14 via a selector valve 13, and the pipe 14 is connected to the lid 2. The pipe 14 is also joined, via a selector valve 15, to another pipe 16 which is connected to the recovery tank 11 through a pipe.

A liquid fraction separated by the condenser 9 is returned from the condenser 9 or the recovery tank 11 to the container body 1 as required, through the pipes 8, 12, 14 and 16 and the selector valves 13 and 15, so as to control the viscosity of the pigment-vehicle fluid in the container body 1.

Other parts of the dispersing apparatus A than the container body 1 are removable from the container body 1. For example, these parts may be liftably supported by a lifting device (not shown).

A mixer B is used in the premixing step preceding the dispersion step. The mixer B comprises the container body 1, and a motor 21 having a rotation shaft 22 and an impeller 23 attached to the rotation shaft 22. The motor 21 of the mixer B is removable from the container body 1 by means of, for example, a lifting device (not shown).

A mixer C similar to the mixer B is used in the adjusting step subsequent to the dispersion step. The mixer C comprises the container body 1, and a motor 31 having a rotation shaft 32 and an impeller 33 attached to the rotation shaft 32.

The container body 1 of the dispersing apparatus A serves also as the container body of the mixers B and C, and thus can be used also in the premixing and adjusting steps.

The dispersing apparatus of the above construction is used in the following manner.

Firstly, a premixing step is performed within the container body 1 which contains a pigment-vehicle fluid therein. During this step, the impeller 23 immersed in the pigment-vehicle fluid is rotated with the rotation shaft 22 by the motor 21 to agitate the pigment-vehicle fluid. In production of a water-based paint, the pigment-vehicle fluid comprises a pigment, water, an organic solvent and a neutralizing agent. In production of an oil-based paint, the pigment-vehicle fluid comprises an organic solvent, a pigment and a varnish.

After the premixing step of a pigment-vehicle fluid in the mixer B, the motor 21 of the mixer B is removed from the container body 1. The container body 1 holding the pre-mixed pigment-vehicle fluid is transferred to the installation place of the dispersing apparatus A.

When the container body 1 has been moved into the installation place, the container body 1 is closed with the lid 2, which lid supports the mixing shaft 4 having the mixing member 3 and supporting the enclosing member 6 at its lower end. Then, the mixing shaft 4 of the dispersing apparatus A is driven to agitate the pigment-vehicle fluid, whereby the fluid is drawn into the enclosing member 6 and discharged therefrom. In the enclosing member 6, the pulverizing media 5 pulverize aggregates (secondary particles) of the pigment into primary particles so that the primary particles are dispersed uniformly in the pigment-vehicle fluid. Thus, upon agitation with the mixing shaft 4, the pigment-vehicle fluid passes through the enclosing member 6 repeatedly, and thereby dispersion proceeds together with pulverization by means of the pulverizing media 5.

Simultaneously with the dispersion, a vacuum pump 10 is operated to reduce the pressure in the container body 1 which is air-tightly closed with the lid 2. The pressure in the container body 1 reduced by the vacuum pump is maintained in the range of −0.095 to −0.01 MPa at gauge pressure. If the pressure is higher than −0.01 MPa at gauge pressure, air (or air and water in the case of oil-based paint) adsorbed on the surface of pigment particles may not be sufficiently removed, resulting in poor dispersion of the pigment particles.

Evaporated components removed from the air-tightly closed container body 1 by the reducing pressure therein are separated into a gas fraction and a liquid fraction in the condenser 9. The gas fraction in the condenser 9 is released from the outlet port 10a via the vacuum pump 10, while the liquid fraction is stored in a recovery tank 11. The liquid fraction is mainly composed of water and organic solvent when the vehicle is water-based, and mainly composed of organic solvent when the vehicle is oil-based.

Removal of air or air/water from the pigment surface under reduced pressure increases contact between pigment and vehicle, resulting in reduced viscosity of the pigment-vehicle fluid. An excessively low viscosity of the fluid will cause decrease of dispersibility of the pigment, bumping under reduced pressure, or abrasion of the pulverizing media 5.

On the other hand, the viscosity of the pigment-vehicle fluid increases when the liquid component (water or water/organic solvent) is lost by evaporation under reduced pressure or elevated temperature. When the viscosity of the pigment-vehicle fluid becomes excessively high, the collision between the pulverizing media in the enclosing member 3 decreases or air adsorbed on the pigment surface cannot be removed, leading to poor dispersibility.

In view of the above, the viscosity of the pigment-vehicle fluid is controlled usually at a value between 0.01 to 100 Pa·s, preferably at a value between 0.1 to 80 Pa·s.

The apparatus of the invention is so constructed that the liquid fraction (water or water/organic solvent) separated by the condenser 9 is returned to the air-tightly closed container body 1 during the steady dispersing operation. The condenser 9 is located at a higher position than the container body 1, and a selector valve 13 is open to a pipe 14 connected to the lid 2 during the steady operation. Before the operation attains a steady state, the selector valve 13 is open to the recovery tank 11 to drain the liquid fraction separated by the condenser 9 into the recovery tank 11. In such a manner, the concentration of solid components in the pigment-vehicle fluid in the dispersion step can be maintained at a value of 5 to 20 wt. % higher, preferably 7 to 15 wt. % higher, than the solid concentration of the pigment-vehicle fluid initially charged into the dispersing apparatus, and thus the viscosity is regulated in the specified range. When the solid concentration should exceed the desired value and the viscosity should increase correspondingly, a pump P could be activated to supply an additional quantity of the liquid from the recovery tank to the container body 1, to control the viscosity.

During the dispersion step, the pigment-vehicle fluid is maintained at a temperature not higher than 70° C., preferably at a temperature between 20 and 60° C. When the temperature is higher than 70° C., the vehicle in the container body 1 may bump and explosively flow into the condenser 9, impairing the function of the condenser 9 or deteriorating the quality of the paint to be obtained as a final product.

As a temperature regulator for the container body 1, a hollow annular jacket (not shown) through which steam or cooling water is circulated may be provided around the outer wall of the container body 1. Heating by the temperature regulator may be required at the initial stage of the dispersing step. However, the temperature in the container body 1 is gradually elevated with the lapse of time to a desired level of not higher than 70° C. with the heat released by friction of the particles and the like. After the temperature of the pigment-vehicle fluid has reached at a predetermined level, the temperature regulator serves to cool the container body 1 for preventing excessive heat rise caused by frictional heat, thereby controlling the temperature within a desired range.

The pigment particles dispersed under reduced pressure according to the invention is substantially free of air and can adsorb the resin component effectively to form a pseudo-Newtonian fluid. Further, according to the present invention, pigment particles can be efficiently dispersed in a water-based vehicle, in which pigments show poor dispersibility according to the prior art. Moreover, according to the invention, it is possible to prevent degradation of the pigment-vehicle fluid and reduction of dispersibility of pigment particles, by dispersion at a mild temperature not higher than 70° C. Furthermore, since the pigment particles were dispersed while maintaining the viscosity of the pigment-vehicle fluid within the range of 0.01 to 100 Pa·s, air or air/water can be effectively removed from the surface of pigment particles under reduced pressure, resulting in improved dispersibility of the pigment particles.

After the dispersion step, the lid 2 is detached from the container body 1, and the container body 1 is transferred to the installation place of the mixer C for the adjustment of the pigment-vehicle fluid. Then, the rotation shaft 32 is inserted into the container body 1 to perform the adjusting step. Instead of moving the container body 1, it is also possible to transfer other parts of the dispersing apparatus A or the mixer B or C than the container body 1.

Since the container body 1 is removable from other parts of the dispersing apparatus A, the container body 1 can be utilized also in the mixers B and C for the premixing and adjusting steps. Consequently, the dispersing apparatus of the invention will save the factory space and reduce the equipment cost.

In the dispersing apparatus of the invention, the pigment-vehicle fluid is agitated with the mixing shaft 4 so as to pass through the enclosing member 6 repeatedly, as described hereinbefore. Therefore, even when the container body 1 has a large volume, pigment particles are uniformly dispersed in a vehicle without using a large amount of the pulverization media.

What is claimed is:

1. A dispersing apparatus comprising a container body; a sealable lid detachable from the container body; a mixing shaft supported by and extending from the lid and having a mixing member; an enclosing member supported by the lid or the mixing shaft and surrounding the mixing member; the enclosing member containing pulverizing media and permitting a pigment-vehicle fluid to pass therethrough; a vacuum pump connected to the lid through a condenser and pipes to reduce the pressure in the container body; and a recovery tank connected to the condenser to collect a liquid fraction separated from a gas fraction by the condenser; wherein the recovery tank and the condenser are connected to the lid through pipes so that the liquid fraction separated by the condenser can be returned from the recovery tank or the condenser to the container body when required, in order to control the viscosity of the pigment-vehicle fluid.

2. A dispersing apparatus according to claim 1, wherein the container body is provided with a transfer member.

3. A dispersing apparatus according to claim 1, wherein component parts other than the container body are liftably supported by a lifting device and removable from the container body.

4. A dispersing apparatus comprising:
   a container body configured to be used in a premixing step, a dispersion step and an adjusting step; and
   an assembly supported liftably, the assembly comprising:
   a) a sealable lid which is detachable from the container body;
   b) a mixing shaft supported by and extending from the lid and having a mixing member at its lower end;
   c) an enclosing member supported by the lid and surrounding the mixing member, the enclosing member containing pulverizing media and permitting a pigment-vehicle fluid to pass therethrough;
   d) a vacuum pump connected to the lid by pipes through a condenser to reduce the pressure in the container body; and
   e) a recovery tank connected to the condenser to collect liquid fraction isolated from gas fraction by the condenser.

5. A dispersing apparatus according to claim 4, wherein the container body is provided with transfer members.

* * * * *